United States Patent
Goebel et al.

(10) Patent No.: US 8,752,648 B2
(45) Date of Patent: Jun. 17, 2014

(54) METHOD AND SYSTEM FOR PREDICTING A DRILL STRING STUCK PIPE EVENT

(71) Applicants: Thomas Goebel, Magnolia, TX (US); Roberto Valerio Molina, Houston, TX (US); Ricardo Vilalta, Houston, TX (US); Kinjal Dhar Gupta, Houston, TX (US)

(72) Inventors: Thomas Goebel, Magnolia, TX (US); Roberto Valerio Molina, Houston, TX (US); Ricardo Vilalta, Houston, TX (US); Kinjal Dhar Gupta, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/883,822

(22) PCT Filed: Oct. 26, 2012

(86) PCT No.: PCT/US2012/062100
§ 371 (c)(1),
(2), (4) Date: May 7, 2013

(87) PCT Pub. No.: WO2013/066746
PCT Pub. Date: May 10, 2013

(65) Prior Publication Data
US 2014/0110167 A1    Apr. 24, 2014

Related U.S. Application Data

(60) Provisional application No. 61/554,531, filed on Nov. 2, 2011.

(51) Int. Cl.
*E21B 45/00* (2006.01)
*E21B 44/00* (2006.01)
*G06N 3/08* (2006.01)
*E21B 41/00* (2006.01)
*G06N 99/00* (2010.01)

(52) U.S. Cl.
CPC ............ *E21B 41/0092* (2013.01); *E21B 44/00* (2013.01); *G06N 3/08* (2013.01); *G06N 99/005* (2013.01)
USPC ................................. 175/40; 702/9

(58) Field of Classification Search
USPC ........................................ 175/40, 57; 702/9
See application file for complete search history.

(56) References Cited

U.S. PATENT DOCUMENTS 4,791,998 A   12/1988   Hempkins et al.
5,181,172 A    1/1993   Whitten (Continued)

OTHER PUBLICATIONS

International Search Report and Written Opinion issued Feb. 28, 2013 in International Patent Application No. PCT/US2012/062100, filed Oct. 26, 2012.

(Continued)

*Primary Examiner* — William P Neuder
(74) *Attorney, Agent, or Firm* — Mark E. Scott; Michelle N. Safer; Conley Rose, P.C.

(57) ABSTRACT

Predicting a drill string stuck pipe event. At least some of the illustrative embodiments are methods including: receiving a plurality of drilling parameters from a drilling operation; applying the plurality of drilling parameters to an ensemble prediction model comprising at least three machine-learning algorithms operated in parallel, each machine-learning algorithm predicting a probability of occurrence of a future stuck pipe event based on at least one of the plurality of drilling parameters, the ensemble prediction model creates a combined probability based on the probability of occurrence of the future stuck pipe event of each machine-learning algorithm; and providing an indication of a likelihood of a future stuck pipe event to a drilling operator, the indication based on the combined probability.

29 Claims, 8 Drawing Sheets

(56) References Cited

U.S. PATENT DOCUMENTS

| | | | |
|---|---|---|---|
| 5,316,091 | A | 5/1994 | Rasi et al. |
| 5,952,569 | A | 9/1999 | Jervis et al. |
| 6,728,689 | B1 | 4/2004 | Drissi et al. |
| 6,842,751 | B1 | 1/2005 | Vilalta et al. |
| 8,170,800 | B2 | 5/2012 | Aamodt et al. |
| 8,332,153 | B2 | 12/2012 | Aamodt et al. |
| 2004/0124012 | A1 | 7/2004 | Dunlop et al. |
| 2010/0235101 | A1 | 9/2010 | Aamodt et al. |
| 2011/0161123 | A1* | 6/2011 | Nrusimhan et al. ......... 705/7.11 |
| 2012/0158761 | A1 | 6/2012 | Aamodt et al. |
| 2013/0080062 | A1 | 3/2013 | Aamodt et al. |

OTHER PUBLICATIONS

Murillo, A. et al. Pipe Sticking Prediction and Avoidance Using Adaptive Fuzzy Logic and Neural Network Modeling. SPE 120128. 2009, Society of Petroleum Engineers. 2009 SPE Production and Operations Symposium; Oklahoma City, Oklahoma; Apr. 4-8, 2009.

Weakley, R.R. Use of Stuck Pipe Statistics to Reduce the Occurrence of Stuck Pipe. SPE 20410. 1990, Society of Petroleum Engineers. 65th Annual Technical Conference and Exhibition of SPE; New Orleans, LA; Sep. 23-26, 1990.

Miri, R. et al. Development of Artificial Neural Networks to Predict Differential Pipe Sticking in Iranian Offshore Oil Fields. SPE 108500. 2007, Society of Petroleum Engineers. 2007 International Oil Conference and Exhibition; Veracruz, Mexico; Jun. 27-30, 2007.

Lian, Z. et al. A Study on Drilling Risk Real Time Recognition Technology Based on Fuzzy Reasoning. SPE 131886. 2010, Society of Petroleum Engineers. CPS/SPE International Oil & Gas Conference and Exhibition; Beijing, China; Jun. 8-10, 2010.

Mohaghegh, S. Recent Developments in Application of Artificial Intelligence in Petroleum Engineering. SPE 89033. Apr. 2005, Society of Petroleum Engineers. Journal of Petroleum Technology. vol. 57, No. 4.

* cited by examiner

METHOD AND SYSTEM FOR PREDICTING A DRILL STRING STUCK PIPE EVENT

CROSS-REFERENCE TO RELATED APPLICATIONS

This application claims the benefit of provisional application No. 61/554,531 filed Nov. 2, 2011, tiled "System and method for predicting a drill string stuck pipe event," which provisional application is incorporated by reference herein as if reproduced in full below.

BACKGROUND

In drilling boreholes for hydrocarbon extraction, on occasion the drill string (e.g., drill bit, drill collars, and drill string) used to create the borehole may become stuck in the borehole during a drilling operation, costing the drilling company money and time. The cost may be associated with time to dislodge the drill string, the cost may be associated with a "fishing" operation if the drill string is broken off, or the cost may also be associated with lost equipment if the drill string cannot be dislodged and/or retrieved. Existing software tools may predict the possibility of stuck equipment; however, existing software are based in large part on human prediction and are unreliable. Thus, a method which is able to more reliably predict the possibility of stuck equipment would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Figure 1:
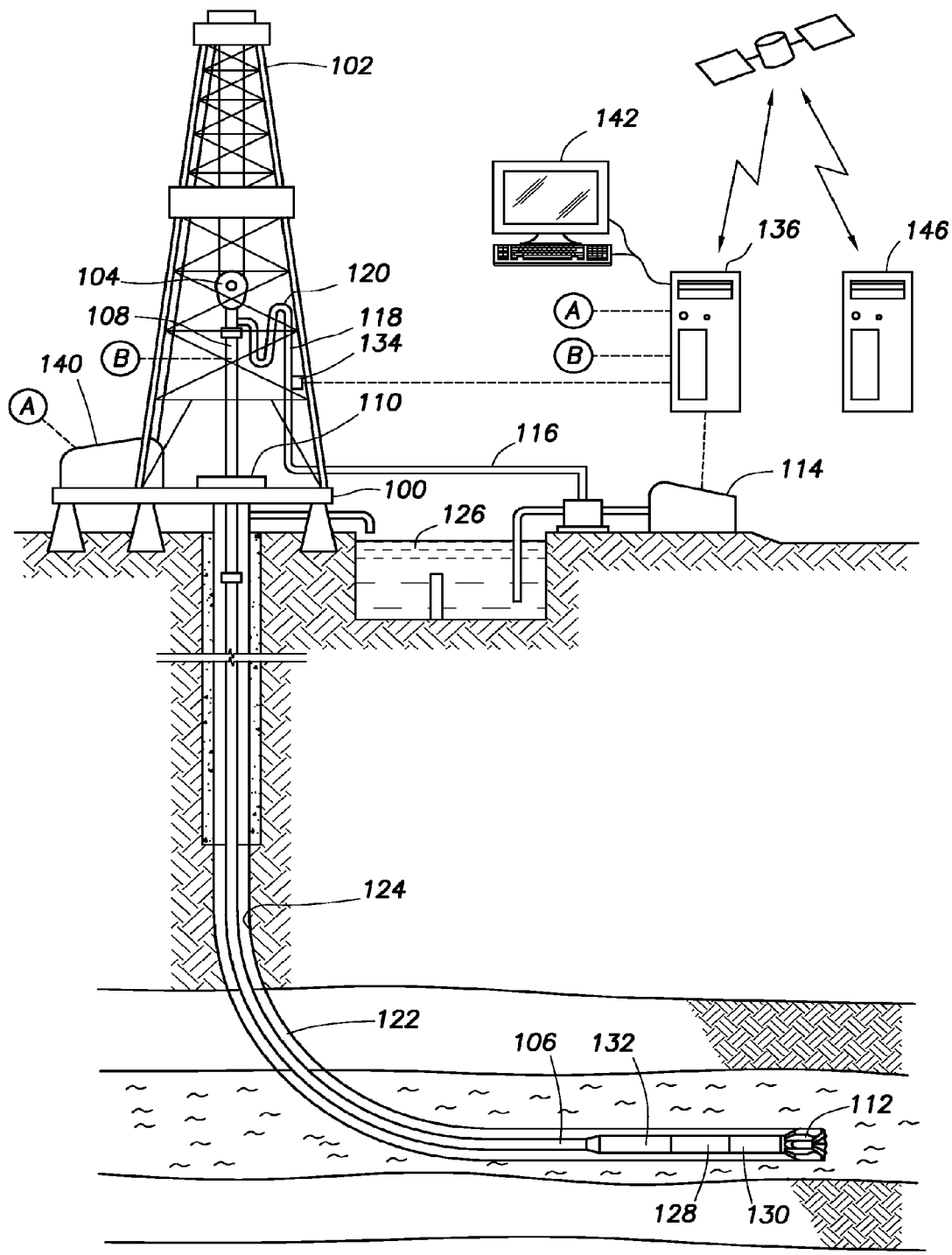
FIG. 1 shows a drilling operation in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Real-time" shall mean that the event indicated to be in "real-time" takes place within 5 minutes or less.

"Markov model" shall mean a computer model defined by a finite number of states, where transition from a current state to the next state is based on previous state, the current state, and an additional parameter (e.g., a probability of occurrence of a future stuck pipe event).

"Gamma" or "gammas" shall mean energy created and/or released by particular atomic nuclei, and shall include such energy whether such energy is considered a particle (i.e., a gamma particle) or a wave (i.e., gamma ray or wave).

"Remote" shall mean one kilometer or more.

"Drilling parameter" shall mean data indicative of the state of a process parameter associated with a drilling operation.

"Machine-learning algorithm" shall mean a type of learning algorithm which takes empirical data as input in order to recognize patterns and make intelligent predictive decisions based on the input data.

"Relational database" shall mean a collection of data items organized as a set of tables from which data can be accessed.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to methods and systems for predicting the probability of the occurrence of drill string becoming stuck in the borehole (i.e., a stuck pipe event) in a drilling operation, the predicting in advance of the stuck pipe event so that preventative measures may be taken. Example embodiments address the issues, at least in part, by use of an ensemble of machine-learning algorithms used as a prediction model (i.e., an ensemble prediction model). The ensemble prediction model predicts the probability of the occurrence of a future stuck pipe event and supplies the probability for use, such as to a driller in a drilling operation. The specification first turns to an overview of a drilling operation to orient the reader.

FIG. 1 shows a drilling operation in accordance with example systems. In particular, FIG. 1 shows a drilling platform 100 equipped with a derrick 102 that supports a hoist 104. Drilling in example situations is carried out by a string of drill pipes connected together by "tool" joints so as to form a drill string 106. The hoist 104 suspends a top drive 108 that is used to rotate the drill string 106 and to lower the drill string through the wellhead 110. Connected to the lower end of the drill string 106 is a drill bit 112. Drilling accomplished by rotating the drill bit 112. Rotation of the drill bit 112 may be by rotating drill string 106 by way of the top drive 108, by use of a downhole "mud" motor near the drill bit 112 that turns the drill bit 112, or by both methods. Drilling fluid is pumped by mud pump 114 through flow line 116, stand pipe 118, goose neck 120, top drive 108, and down through the drill string 106 at high pressures and volumes to emerge through nozzles or jets in the drill bit 112. The drilling fluid then travels back up the wellbore via the annulus 122 formed between the exterior of the drill string 106 and the wellbore wall 124, through a blowout preventer (not specifically shown), and into a mud pit 126 on the surface. On the surface, the drilling fluid is cleaned and then circulated again by mud pump 114. The drilling fluid is used to cool the drill bit 112, to carry cuttings from the base of the borehole to the surface, and to balance the hydrostatic pressure in the rock formations.

In accordance with the example systems, the drill string 106 may comprise a logging-while-drilling ("LWD") tool 128 and a measuring-while-drilling ("MWD") tool 130. The distinction between LWD and MWD is sometimes blurred in the industry, but for purposes of this specification and claims, LWD tools measure properties of the surrounding formation (e.g., porosity, permeability, natural gamma radiation), and MWD tools measure properties associated with the borehole (e.g., inclination, direction, weight-on-bit, drill bit revolutions-per-minute ("RPM")). The tools 128 and 130 may be coupled to a telemetry module 132 that transmits data to the surface. In some embodiments, the telemetry module 132 sends data to the surface electromagnetically. In other cases, the telemetry module 132 sends data to the surface by way of electrical or optical conductors embedded in the pipes that make up the drill string 106. In yet still other cases, the telemetry module 132 modulates a resistance to drilling fluid flow within the drill string to generate pressure pulses that propagate at the speed of sound of the drilling fluid to the surface.

Still referring to FIG. 1, in the illustrative case of data encoded in pressure pulses that propagate to the surface, one or more transducers, such as transducers 134 convert the pressure signal into electrical signals. The electrical signals are coupled (e.g., after being digitized by digital-to-analog converter) to a computer system 136 or some other form of a data processing device located near the drilling site. Computer system 136 operates in accordance with software (which may be stored on a computer-readable storage medium) to process and decode the received signals. The data sent from the downhole devices to the surface may be useful in predicting stuck pipe events, as discussed more thoroughly below.

The example computer system 136 may also be coupled to, and in some cases controlling, various surface-based equipment. The example communicative couplings are shown in dashed lines in FIG. 1 so as not to unduly complicate the drawings. For example, the computer system 136 may communicatively couple to the mud pump 114. Thus, the computer system 136 may be able to read various parameters associated with the mud pump, such as mud pump operational speed, and outlet pressure. Further, the computer system 136 may communicatively couple to the winch system 140 that controls the hoist 104. From the communicative coupling the computer system 136 may be able to read various parameters associated with the hoist, such as hook load (which may be indicative of weight-on-bit). Further, the computer system may communicatively couple to sensors associated with the top drive 108. From the communicative coupling to the sensors associated with the top drive 108, the computer system 136 may be able to read various parameters such as RPM of the drill string 106 (at the surface), and torque applied to the drill string by the top drive 108.

So as not to unduly complicate the drawing, additional communicative couplings between the computer system 136 and the various drilling system components are omitted. However, a non-limiting list of surface-based parameters that may be directly or indirectly read by the computer systems 136 comprises: hook load; RPM of the drill string at the surface; torque applied to the drill string at the surface; pressure of the drilling fluid as the drilling fluid is pumped into the drill string; pressure of the drilling fluid returning to the surface; and standpipe pressure of the drilling fluid. Moreover, by way of the communicative coupling to the devices within the borehole, other parameters that may be read comprise: weight-on-bit as measured by a MWD tool; RPM of the drill bit; torque downhole (e.g., provided by the mud motor); and inclination of the borehole as measured by the MWD tool. Moreover, parameters associated with the formation proximate the drill bit may be read, such as: formation porosity as measured by an LWD tool; formation permeability as measured by an LWD tool; formation response to neutron irradiation (the response derived from returning neutrons, or from gammas created by neutron interaction) by a LWD tool; and natural gamma production by the formation as measured by the LWD tool.

Still referring to FIG. 1, the computer system 136 may also receive data from a drilling operator by way of an interface device 142. For example, the drilling operator may provide information such as borehole diameter, drill pipe diameter, drill pipe wall thickness, the number of drill pipes in the drill string, drill bit type (e.g., roller cone, fixed cutter bit), drilling fluid parameters (e.g., viscosity, specific gravity). Other parameters, both static and dynamic, may be received by the computer system 136.

Before proceeding, it is noted that while FIG. 1 illustratively shows an example land-based drilling operation, other example systems include subsea drilling operation from a platform or other drilling vessels, and similar sets of drilling parameters may be collected in the subsea drilling situations.

The measured and collected drilling parameters may be stored in at least one, but not limited to one, database in the computer system 136. In yet still other example systems, the computer system 136 may gather drilling parameters, and then forward the data to another computer system 146, such as a computer system at the home office of the oilfield services provider. The communication of data between computer system 136 and computer system 146 may take any suitable form, such as over the Internet, by way of a local or wide area network, or as illustrated over a satellite 244 link. The specification now turns to a brief description of stuck pipe events.

Stuck pipe events are events in which the drill string 106 (and associated downhole equipment) becomes lodged in the borehole. The stuck pipe event may manifest itself as an inability to rotate the drill string from the surface, an inability to raise and/or lower the drill sting by way of the hoist 104, or both. There are many physical reasons for a stuck pipe event, for example: a cave-in of the borehole above the drill bit; drill-cuttings not properly carried away and thus settling within the borehole; turning radius issues in deviated boreholes; adhesion of the drill string based on a lack of movement; high friction between the drill pipe and the borehole walls; differential sticking caused by higher drilling fluid pressure than formation pressure.

Rarely, however, does a stuck pipe event occur instantaneously; rather, the stuck pipe event is in most cases preceded by changes in one or more drilling parameters that indicate the upcoming stuck pipe event, with changes occurring sometimes minutes or even hours prior to the stuck pipe event. For example, increasing torque, decreasing drill string RPM, and decreasing drilling fluid flow may indicate an upcoming stuck pipe event. The difficulty, however, is that there are an enormous number of drilling parameters for the driller to consider, and determining the root cause change of any particular parameter is difficult. Stated otherwise, changes in any one or a small group of drilling parameters may not be recognized as an upcoming stuck pipe event because the changes are slight and/or the changes can be attributable to other phenomena not related to stuck pipes.

Figure 2:
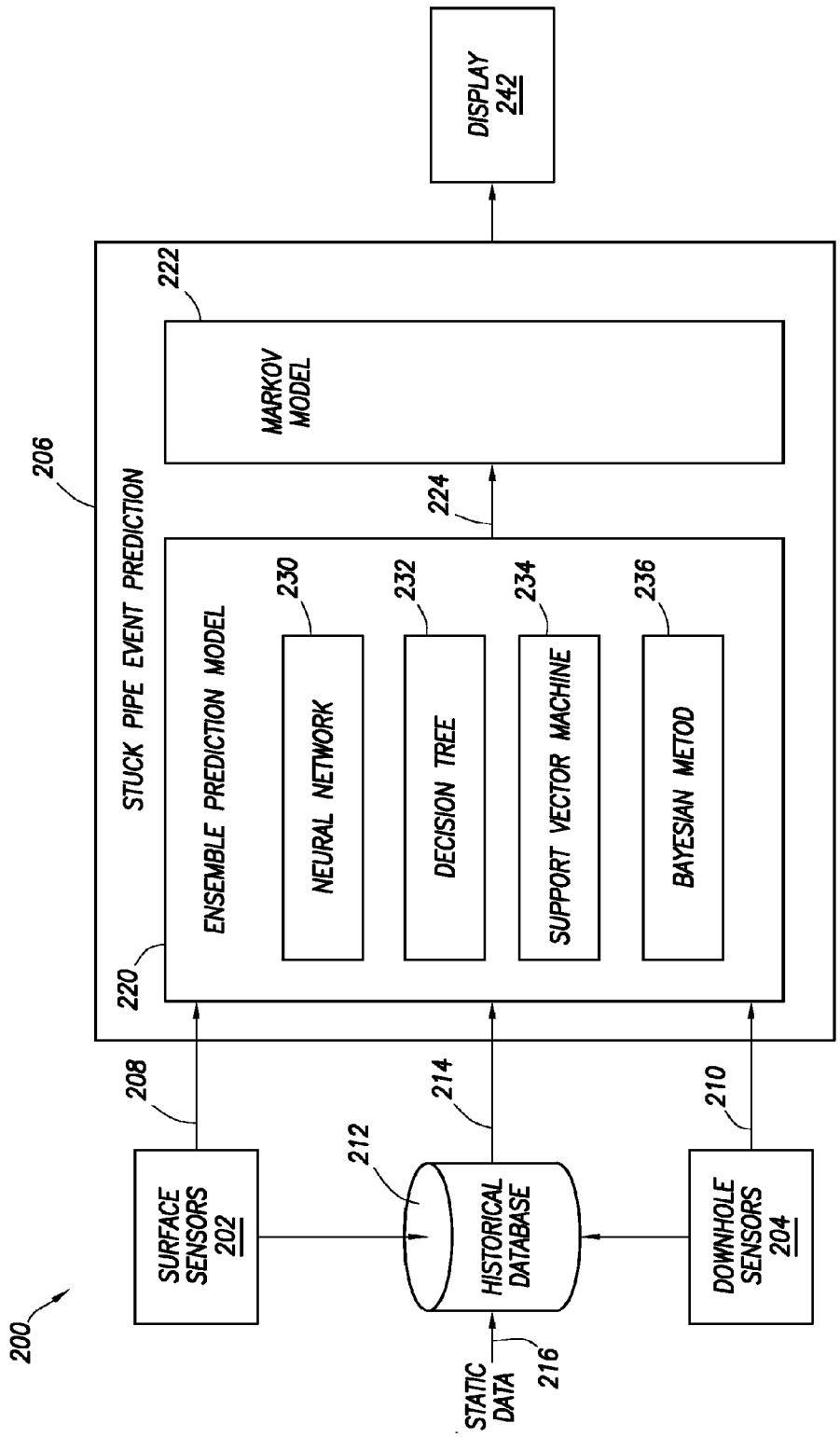
FIG. 2 shows a block diagram of a system to predict the likelihood of a future stuck pipe event in accordance with at least some embodiments.

The various embodiments are directed to assisting drilling operators in avoiding stuck pipe events by providing an indication of a likelihood of a future stuck pipe event sufficiently far in advance that one or more corrective measures may be taken. FIG. 2 shows a block diagram of an example system to predict the likelihood of a future stuck pipe event. In particular, the system 200 comprises surfaces sensors 202 and downhole sensors 204. As discussed with respect to FIG. 1, example surface sensors may include pressure sensors, torque meters, RPM meters, and strain meters (e.g., hook load sensor). Likewise as discussed with respect to FIG. 1, example downhole sensors may include LWD tools and MWD tools telemetering various values to the surface. The surface sensors 202 and downhole sensors 204 create values indicative of drilling parameters (hereafter just "drilling parameters"). In the example system, the drilling parameters from the surface sensors 202 and downhole sensors 204 may be received by stuck pipe event prediction software 206, the receipt from the surface sensors 202 and downhole sensors 204 shown by arrows 208 and 210, respectively. In some cases, the stuck pipe event prediction software 206 may executed, in whole or in part on computer system 136. In other cases, the stuck pipe event prediction software 206 may be executed on remote computer system 146. In yet still other cases, various aspects of the stuck pipe event prediction software may be divided between the example computer systems 136 and 146. For example, the individual machine-learning algorithms of the ensemble prediction model, discussed more below, may be executed on the remove computer system 146, while remaining aspects execute on the computer system 136.

The drilling parameters may also be provided to a historical database 212, from which the stuck pipe event prediction software 206 can likewise receive historical indications of drilling parameters. Much like the stuck pipe event prediction software 206, the historical database 212 may be located within computer system 136, located within computer system 146, or divided between the computer systems. In some cases the stuck pipe event prediction software may operate solely from real-time drilling parameters, but in other cases, particularly where trends in drilling parameters are indicative of upcoming stuck pipe events, the historical data may be used. Finally, the static and somewhat data (e.g., hole diameter, drill pipe outer diameter, length of drill string) may also be applied to the historical database 212, as shown by arrow 216, and thus likewise is accessible by the stuck pipe event prediction software 206, as shown by arrow 214.

The stuck pipe event prediction software 206 may have several logical components. In the example system of FIG. 2, the stuck pipe event prediction software 206 comprises an ensemble prediction model 220 that receives the various drilling parameters and produces a value indicative of probability of a future stuck pipe event, the production of the value indicative of probability of a future stuck pipe event shown by arrow 224. In some cases the value indicative of probability of a future stuck pipe event may be directly communicated to the drilling operator, but in other cases a further refinement is created by applying the value indicative of probability of a future stuck pipe event to a Markov Model 222 (discussed more below). After modification of the value indicative of probability of a future stuck pipe event by the Markov model, the system provides the indication of a likelihood of a future stuck pipe event to the drilling operator by way of display device 242.

Still referring to FIG. 2, the ensemble prediction model 220 may itself comprise a plurality of distinct machine-learning algorithms operated in parallel. That is, the inventors of the current specification have found that while any one machine-learning algorithm may somewhat accurately predict the likelihood of future stuck pipe events, combining three or more distinct machine-learning algorithms may increase the accuracy and thus decrease false positive indications. More particularly still, the inventors of the present specification have found that in some situations a combination of four machine-learning algorithms operated in parallel provide a good balance of high accuracy versus system complexity. The four example machine-learning algorithms comprise a neural network 230, a decision tree 230, a support vector machine 234, and Bayesian methods 236. Each of the example machine-learning algorithms will be addressed in turn.

Figure 3:
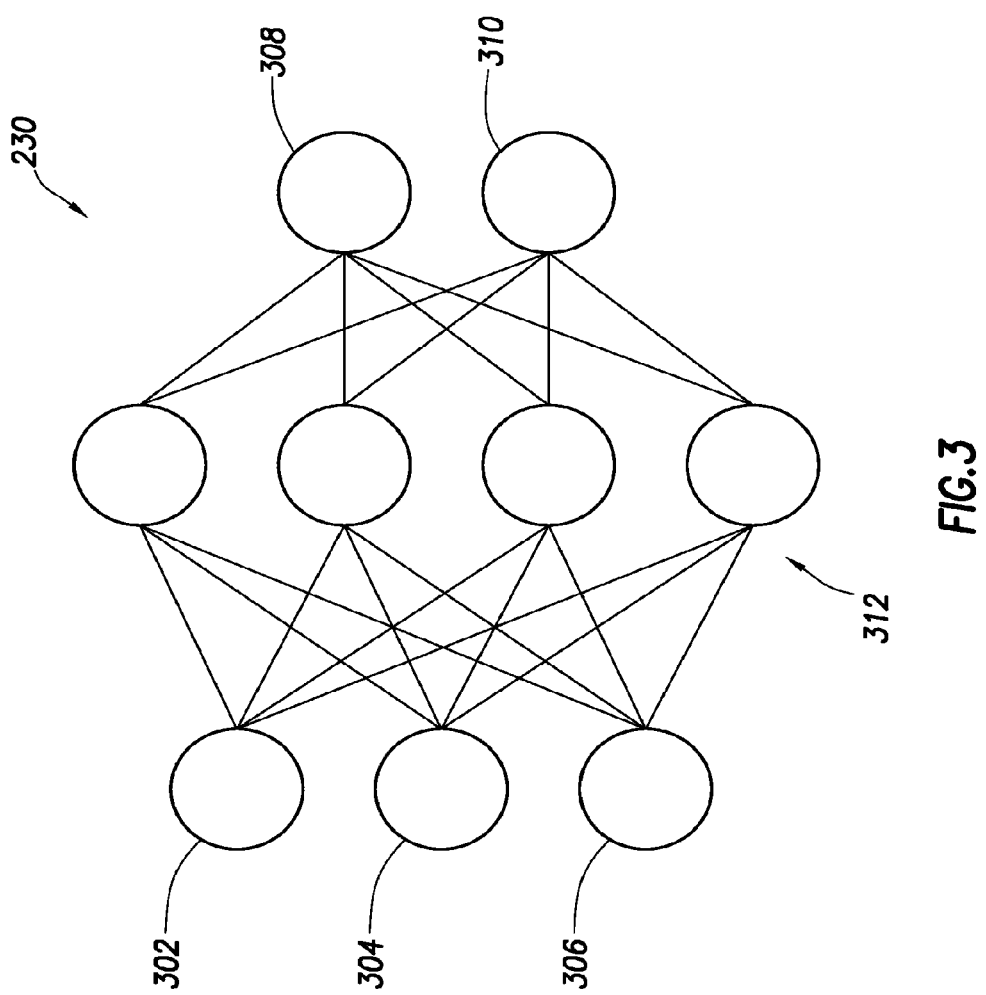
FIG. 3 shows a graphical representation of a neural network in accordance with at least some embodiments.

FIG. 3 shows a graphical representation of a neural network 230. In particular, the example neural network 230 comprises a plurality of input nodes 302, 304, and 306. Input nodes are the points within the neural network to which a datum (e.g., a drilling parameter) is provided for further processing. Moreover, a neural network comprises one or more output nodes, and the example neural network 230 comprises two output nodes 308 and 310. Each output node represents a calculated and/or predicted parameter based on the input data at the input nodes. Between the input nodes and the output nodes are one or more layers of hidden nodes 312. The hidden nodes 312 are coupled to some, or all, of the input nodes. Likewise, the hidden nodes 312 are coupled to some, or all, of the output nodes. Each of the hidden nodes performs a mathematical function that is determined or learned during a training phase of the neural network 230, and where the mathematical function is determined based on the data of the input nodes to which coupled. Likewise, the output nodes may perform mathematical functions based on data provided from the hidden nodes. While FIG. 3 shows three input nodes, two output nodes, and a single hidden layer of four nodes, any number of nodes, and any number of hidden layers, may be used.

The neural network 230 may thus be provided one or more drilling parameters in real-time, and may be also be provided one or more historical values of the drilling parameters based on preprocessing by the stuck pipe event prediction software 206. Preprocessing is discussed in greater detail below. From the values provided to the input nodes the neural network may produce a value at an output node, the value being a probably of occurrence of a future stuck pipe event. For example, output node 308 may predict the probability of a stuck pipe event occurring within 15 minutes, while output node 310 may predict the probability of a stuck pipe event within the next hour. In the various embodiments, the neutral network may be trained (in advance of operation as a real-time predictor of stuck pipe events) using historical data from drilling operations where a stuck pipe event actually occurred. In some cases the historical data may be contained in the historical database 212 and may be accessible during real-time prediction of the likelihood of future stuck pipe events, but in other cases the database used for training the neural network may be a different database. The specification now turns to the decision tree model 232.

A decision tree system or model 232 in accordance with various example systems is a predictive model comprising a plurality of interior nodes, where transitioning from node to node is based on the a set of input parameters, and where the predicted value is arrived at by the model arriving at end node dictated by the input parameters. Decision trees may be alternatively referred to as classification trees or regression trees.

Figure 4:
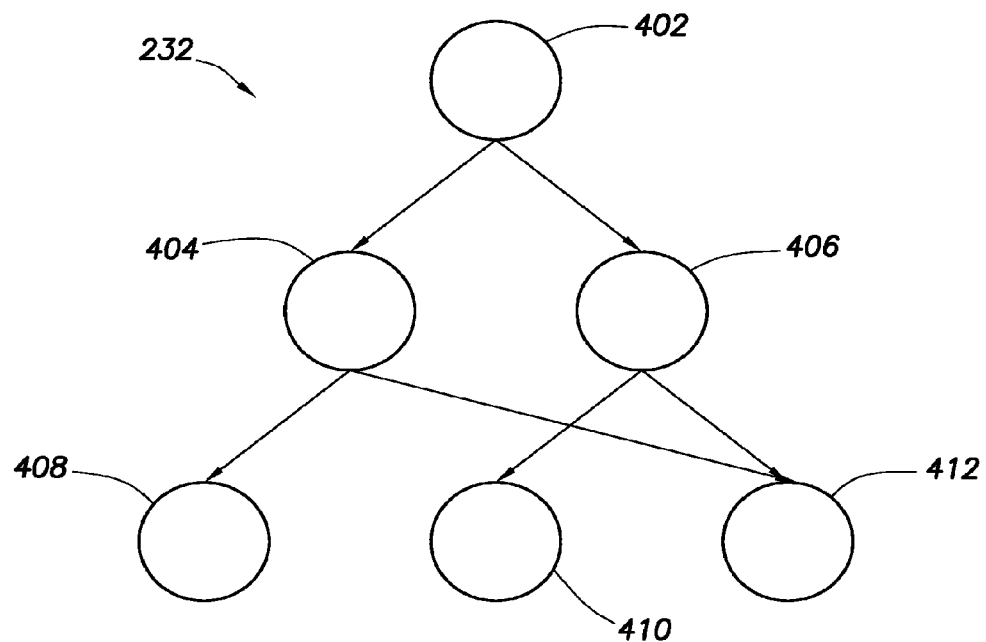
FIG. 4 shows a simplified diagram of a decision tree in accordance with at least some embodiments.

FIG. 4 shows a simplified diagram of a decision tree. In particular, the decision tree 232 comprises a plurality of interior nodes, illustratively labeled nodes 402, 404, 406, 408, 410, and 412. Unlike the neural network 230 where the hidden nodes represent mathematical functions, the interior nodes each represent the state of a drilling parameter (though different nodes represent different drilling parameters). In many situations, there is only one path through the decision tree 232 based on the drilling parameters provided. For example, node 402 may be a node representing torque on the drill string, and where transition from node 402 to node 404 is made if torque is high, and transition from node 402 to node 406 is torque is low. At the next interior node, a transition is made regarding the next drilling parameter. For example, the example node 404 may represent drill string RPM. Thus, if torque was high (hence the transition from node 402), but RPM is high, then the example system may transition from node 404 to node 412 that predicts a low probability of a future stuck pipe event. On the other hand, back at node 404, if RPM is low, the decision tree 232 may transition to node 408 that predicts a high probability of a future stuck pipe event.

Like the neural network 230, the decision tree 232 is trained with historical data from drilling operations (such as data where a stuck pipe event occurred), the training taking place before using the ensemble prediction model 220 is in use in real-time with a drilling operation. Training a decision tree 232 may involve recursive partitioning of a training data set. The decision tree 232 may be trained using the same data set as used to train the neural network 230, or the training data sets may be different. The specification now turns to support vector machines 234.

Support vector machines are a class of machine-learning algorithms that perform classifications of data into groups. In particular, support vector machines can be thought of as performing classification by analysis of the data in a multidimensional space. The number of dimension is unlimited in theory, but in practice a good tradeoff between accuracy and complexity may take place where the multidimensional space has between 3 and 10 dimensions (e.g., the system analyzes between 3 and 10 distinct drilling parameters). Training data is "plotted" or "mapped" in to the multidimensional space, and classified or grouped spatially. It is noted that the plotting or mapping need not be a true physical plotting, but a conceptual operation. After the training phase, data to be analyzed is also then plotted or mapped into the multidimensional space, and the support vector machine 234 makes a determination as to the most likely classification of the data. In some cases, the classification of the data to be analyzed may be a "distance" calculation between the spatial location of the data to be analyzed in the mappings and the "nearest" classification.

Figure 5:
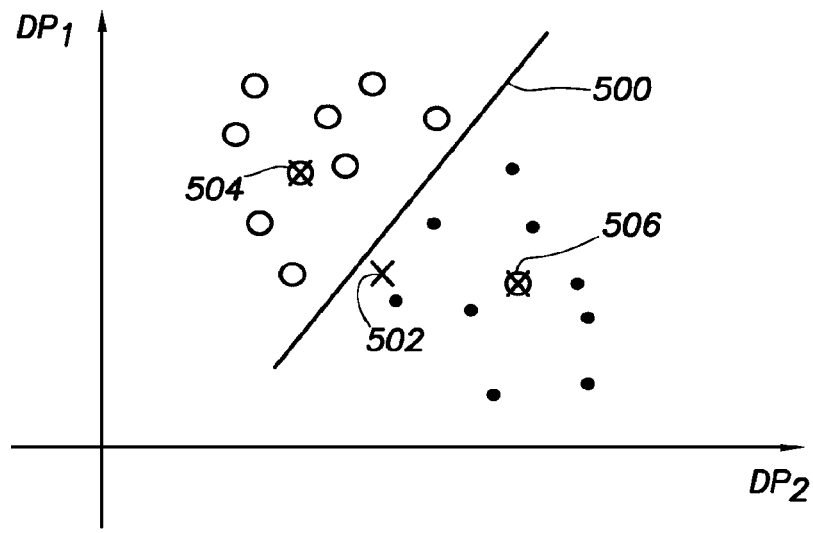
FIG. 5 shows a high level diagram of a support vector machine in accordance with at least some embodiments.

FIG. 5 shows a diagram to aid in a high level explanation of support vector machines 234. FIG. 5 can be thought of as representing a three-dimensional space, where the first dimension is a first drilling parameter (DP1), a second dimension is a second drilling parameter (DP2), and a third dimension is whether each data point represents a stuck pipe event. In the training phase, the support vector machine 234 may be provided drilling parameters from drilling operations where stuck pipe events took place (data points plotted as small circles), and drilling parameters from drilling operations where no stuck pipe occurred (data points plotted as solid dots). The support vector machine 234 plots the data in a multidimensional space, and then classifies the data. In the example of FIG. 5, line 500 represents a spatial delineation between data with stuck pipe events, and data without stuck pipe events.

In applying the support vector machine 234 to real-time drilling parameters, the support vector machine 234 may plot a data point under test in the multidimensional space, the plotted point for the example real-time data shown as point "x" 502. In some cases, the support vector machine 234 may then predict a result (here a likelihood of a future stuck pipe event) based on the spatial position of the plotted point relative to the classification line 500. In other cases, the support vector machine 234 may predict the outcome based on a distance function from the classifications, such as a distance from the plotted point 502 to the geometric center of the stuck pipe events 504 from the training data, the distance to the geometric center of the no stuck pipe events 506, and/or the distance away from the line 500 that delineates the classes in the function. The specification now turns to Bayesian methods 236.

The Bayesian methods 236 represent a logically different view of data and probabilities. That is, the Bayesian methods 236 can be thought of as testing the plausibility of a hypothesis (e.g., a stuck pipe event will occur in the future) based on a previous set of data. The Bayesian methods 236 may be considered non-deterministic in the sense that Bayesian methods in general assume the plausibility of a hypothesis is based on unknown or unknowable underlying data or assumptions. Using Bayesian methods a value indicative of plausibility of a hypothesis is determined based on the previous data (e.g., the training data), and then plausibility is tested again in view of new data (here, the drilling parameters applied). From the evaluation, a plausibility of the truth of the hypothesis is determined.

Figure 6:
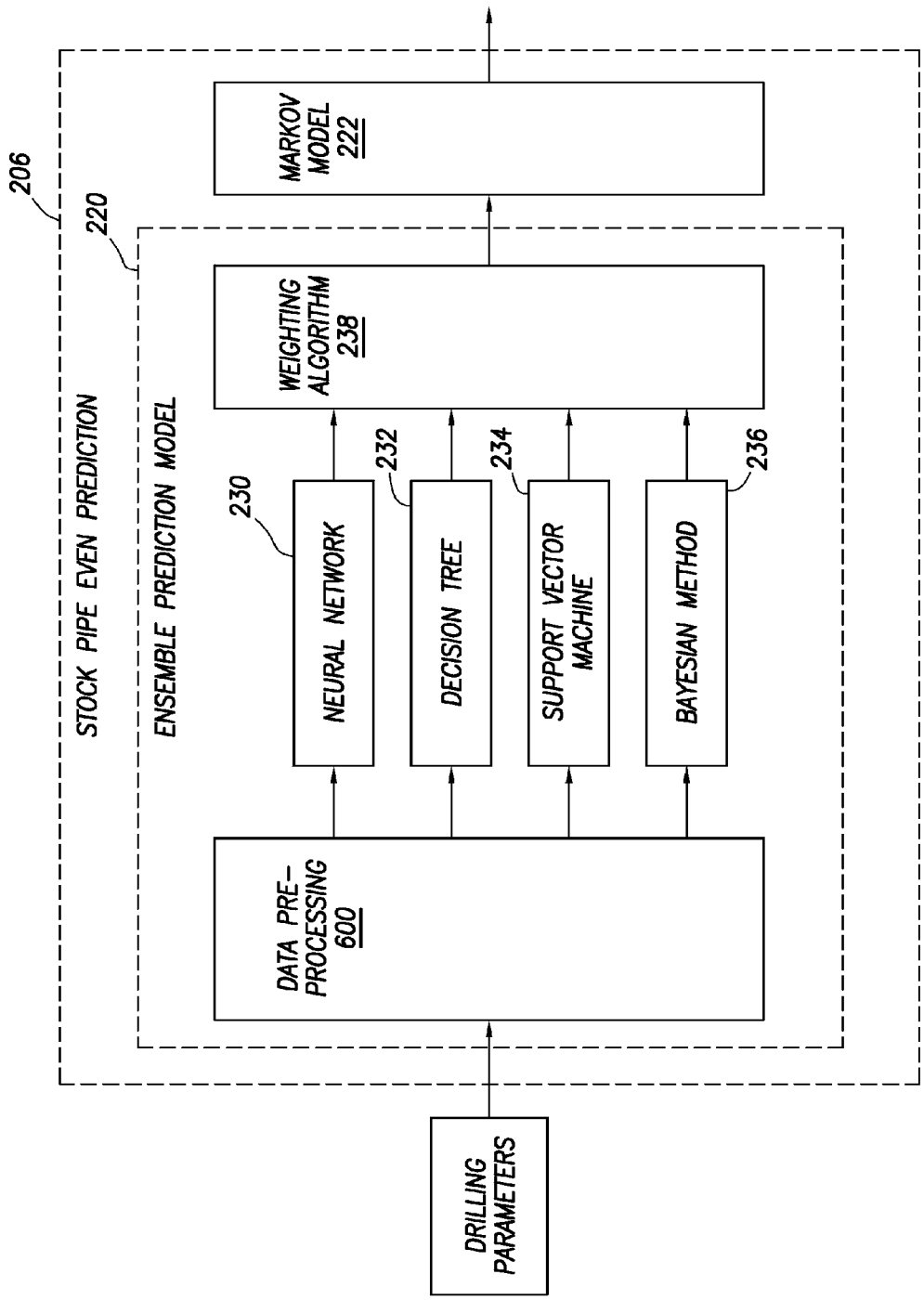
FIG. 6 shows a block diagram of a logical flow diagram of operation or stuck pipe event prediction software in accordance with at least some embodiments.

FIG. 6 shows, in block diagram form, a logical flow diagram of operation of the stuck pipe event prediction software 206 in accordance with example methods. FIG. 6 also show a logical grouping of the methods as between the internal ensemble prediction model 220 and the overall stuck pipe event prediction software 206; however, the logical grouping is merely illustrative, and various components may be implemented differently. In particular, in example embodiments, the drilling parameters may be subjected to a data pre-processing algorithm 600. The data pre-processing algorithm may perform many functions, such as creating reduced set of drilling parameters, where the drilling parameters in the reduced set display a high predictive power (i.e., a high correlation with the occurrence of a stuck pipe event). Various statistical ranking techniques may be applied to the drilling parameters to rank them according to their correlation merit. For example, a chi-squared distribution, gain ratio, and/or information gain value may be determined for each drilling parameter to determine its relevance to predicting a stuck pipe event. After the reduced set is identified by the data pre-processing 600, the stuck pipe event prediction software 206 may elect to apply only the reduced set of drilling parameters to the machine-learning algorithms, which may further reduce false positives or increase confidence values of the various machine-learning algorithms.

By way of an example, the reduced set of drilling parameters may comprise, for example, 10 relevant variables. The stuck pipe event prediction software 206 may creation additional variables by finding the rate of change of each drilling parameter in the reduced set, for example over five seconds, one minute, and five minutes (e.g., for a total of 40 variables). The rate of change of variables provides valuable information on the behavior of each variable across time, which can be exploited to better predict a stuck pipe event.

The example reduced data set described above, including 10 highly relevant measured variables plus 30 time change versions of the variables, may be further reduced by the data pre-processing algorithm 600. For example, the method may employ Principal Component Analysis (PCA), which utilizes an orthogonal transformation to convert the set of correlated variables into a set of values of uncorrelated variables called principal components. In essence, a new variable space is defined where each dimension is a linear combination of the original variable space of 40 variables. The new linear combinations attempt to capture the direction of increased variance.

Another function that may be performed by the data pre-processing algorithm 600 may be referred to as data projecting. That is, in some cases the stuck pipe event prediction software 206 may operate solely on real-time and earlier historical data (and training data); however, in other cases the likelihood of a future stuck pipe event may be determined by projecting a certain amount historical data into the future as future data. More particularly the stuck pipe even prediction software 206 (and in some cases the data pre-processing algorithm 600) may read historical data for the plurality of drilling parameters and apply the historical data as data gathered prior to the current time, and may also change the time base of the historical data and submit the historical data to the machine-learning algorithms as data gathered after the current time. The process can be conceptually thought of as asking the question "what happens if we continue to operate with the current configuration for a period of time into the future?"

Regardless of the data reduction and/or data projecting performed by the data pre-processing algorithm 600, in accordance with example methods portions or all the data is applied the to the machine-learning algorithms 230, 232, 234, and 236 in parallel. That is, each machine-learning algorithm takes the input data and produces a probability of occurrence of the future stuck pipe event. In some cases, the individual probabilities are combined (e.g., averaged) and passed to the next step in the method (e.g., the Markov model, or directly to the drilling operator display device).

In some example embodiments, however, the probability of occurrence of the future stuck pipe event from each machine-learning algorithm is not given equal weight in the combined probability. More particularly still, in accordance with example methods the ensemble prediction model 220 may assign weighting coefficients to each machine-learning algorithm 230, 232, 234, and 236 such that combined probability is based on the weighting coefficients. The following equation may be used in example methods to compute the combined probability from the weighted individual probabilities.

$$CB = \frac{\sum_{i=1}^{N} WC_i^* PO_i}{N} \quad (1)$$

where CB is the combined probability, $WC_i$ is a weighting coefficient for the ith machine-learning algorithm, POi is the probability of occurrence of the future stuck pipe event created by the ith machine-learning algorithm, and N is the number of machine-learning algorithms operated within the ensemble prediction model 220.

The weighting coefficients may be assigned to the machine-learning algorithms based on a plurality of considerations. For example, depending on the state of the drilling operation, some machine-learning algorithms may be better at predicting upcoming stuck pipe events, and thus the ensemble prediction model 220 may assign greater weighting coefficients to those machine-learning algorithms. Changes in assignment of weighting coefficient may be made on a drilling interval-by-drilling interval basis (e.g., every six inches, or every foot), but in many cases the changes in weighting coefficients based on the propensity of a particular machine-learning algorithm to better predict will be slowly changing over hundreds or thousands of feet in length and/or true vertical depth.

Another issue that may be addresses by the weighting coefficients is lack of data. While in the ideal case the data associated with all drilling parameters would be accessible by the stuck pipe predicting algorithm, in many cases equipment failures and communication issues (particularly for downhole sensors) may make some data unavailable. Thus, in accordance with at least some example methods the ensemble prediction model 220 may change the weighting coefficients based on the amount of data provided to a particular machine-learning algorithm. For example, if the neural network 230 normally receives and determines its respective probability based on drilling parameters measured downhole and telemetered to the surface, but where communication issues have rendered the data set lacking in some fashion, the ensemble prediction model 220 may lower the weighting coefficient for the example neural network 230.

Opposite use of the weighting coefficients may also be used. That is, a machine-learning algorithm may operate with a particular data set that is normally absent a particular drilling parameter, but when the particular drilling parameter is available, the accuracy of the prediction may increase, and thus the ensemble prediction model 220 may increase the weighting coefficient. For example, data regarding the amount of solids per unit volume of drilling fluid returned to the surface in many cases is not specifically measured; however, in cases where mud logging is performed (i.e., measuring parameters associated with drilling fluid returning to the surface) the solids per unit volume may be supplied to the stuck pipe event prediction software 206 (an in particular one or more of the machine-learning algorithms 230, 232, 234, and 236). When present, the example solids per unit volume may increase the prediction accuracy of a machine-learning algorithm, and thus the ensemble prediction model 220 may increase the weighting coefficient for that machine-learning algorithm.

Still referring to FIG. 6, in many cases the combined probability may be passed directly to the drilling operator; however, in yet still other example methods the combined probability created by the ensemble prediction model may be applied to a Markov model 222. A Markov model is a computer model defined by a finite number of states, where transition from a current state to the next state is based on previous state, the current state, and an additional parameter (e.g., a probability of occurrence of a future stuck pipe event). The Markov model may not only help predict the probability of a stuck pipe event occurring farther into the future, but the Markov model may also reduce the number of false positives reported.

The addition of the Markov model 222 to the ensemble prediction model 220 takes into account time dependencies recognized in the input data, which the machine-learning algorithms 230-236, and thus the ensemble prediction model 220, may not do. Unlike the machine-learning algorithms 230-236, which treat each data set (i.e., drilling parameters) as independent variables not influenced by previous predictions, the Markov model adds confidence to a current prediction of the ensemble prediction model 222 by considering previous predictions.

Figure 7:
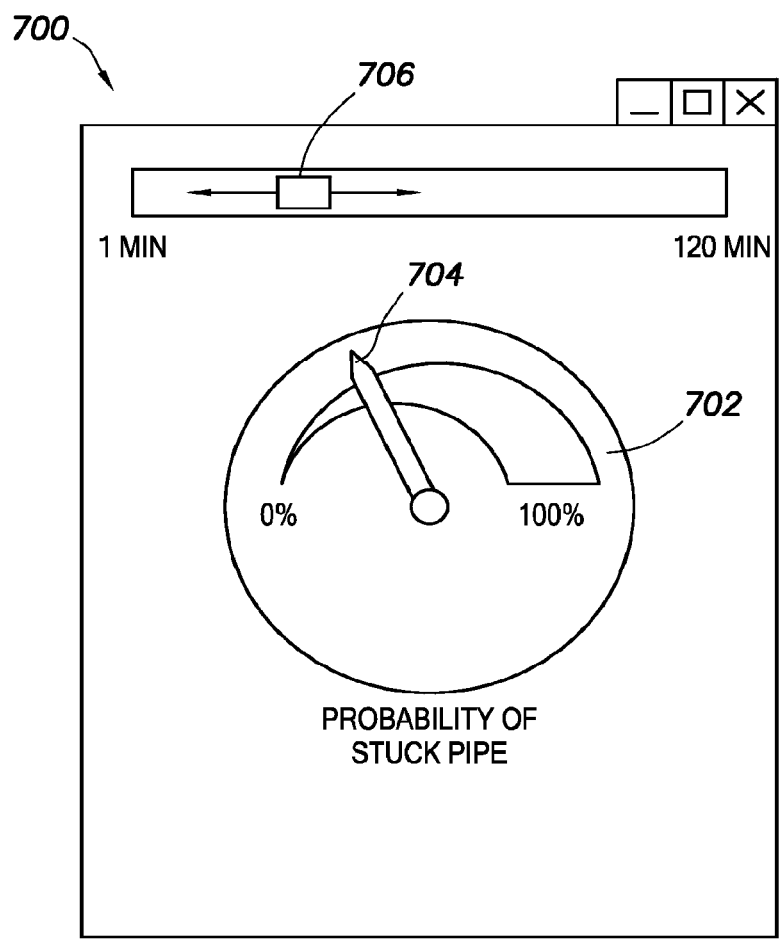
FIG. 7 shows a user interface depicting the probability of a stuck pipe event in accordance with at least some embodiments.

Returning now to FIG. 2, regardless of the precise method utilized within the stick pipe event prediction software 206, the combined probability is provided to the drilling operator as a forward looking indication of the probability of a stuck pipe event. For example, the combined probability may be displayed on the display device 242 as a numeric value. In other cases, the combined probability may be displayed in a graphical form. FIG. 7 shows an example user interface 700 depicting the probability of a stuck pipe event. In particular, the example user interface comprises an analog meter 702 having a pointer 704 indicating a probability of stuck pipe event in the future. While the analog meter 702 has a scale of 0% probability to 100% probability, other ranges may be depicted, and in yet still other cases no expressly probability need be delineated. Moreover, in example systems the user interface 700 also has a time slider bar 706 that may control the point in the future to which the prediction applies. The example slider bar 700 shows to span a time frame from one minute on the left to the 120 minutes on the right, but any time frame may be used.

At the operational level, changing the position of the slider bar 706 may increase or decrease the amount of data projection implemented by the data pre-processing algorithm 600. That is, for a prediction looking ahead only one minute, the real-time drilling parameters (and historical data not projected) may be sufficient. For a prediction looking ahead two hours, the historical data may be duplicated and projected ahead, and thus the ensemble prediction model making a prediction assuming the historical data represents continued future performance.

The methods described above, in particular the data driven machine-learning algorithmic predictions, are able to make predications on data alone. Thus subject matter expertise, such as expertise in the form of human input, is not needed. However, in one embodiment, a subject matter expert may provide additional input based on the historical and current data in order to help further refine the ensemble prediction model or any of the machine-learning algorithms individually.

Figure 8:
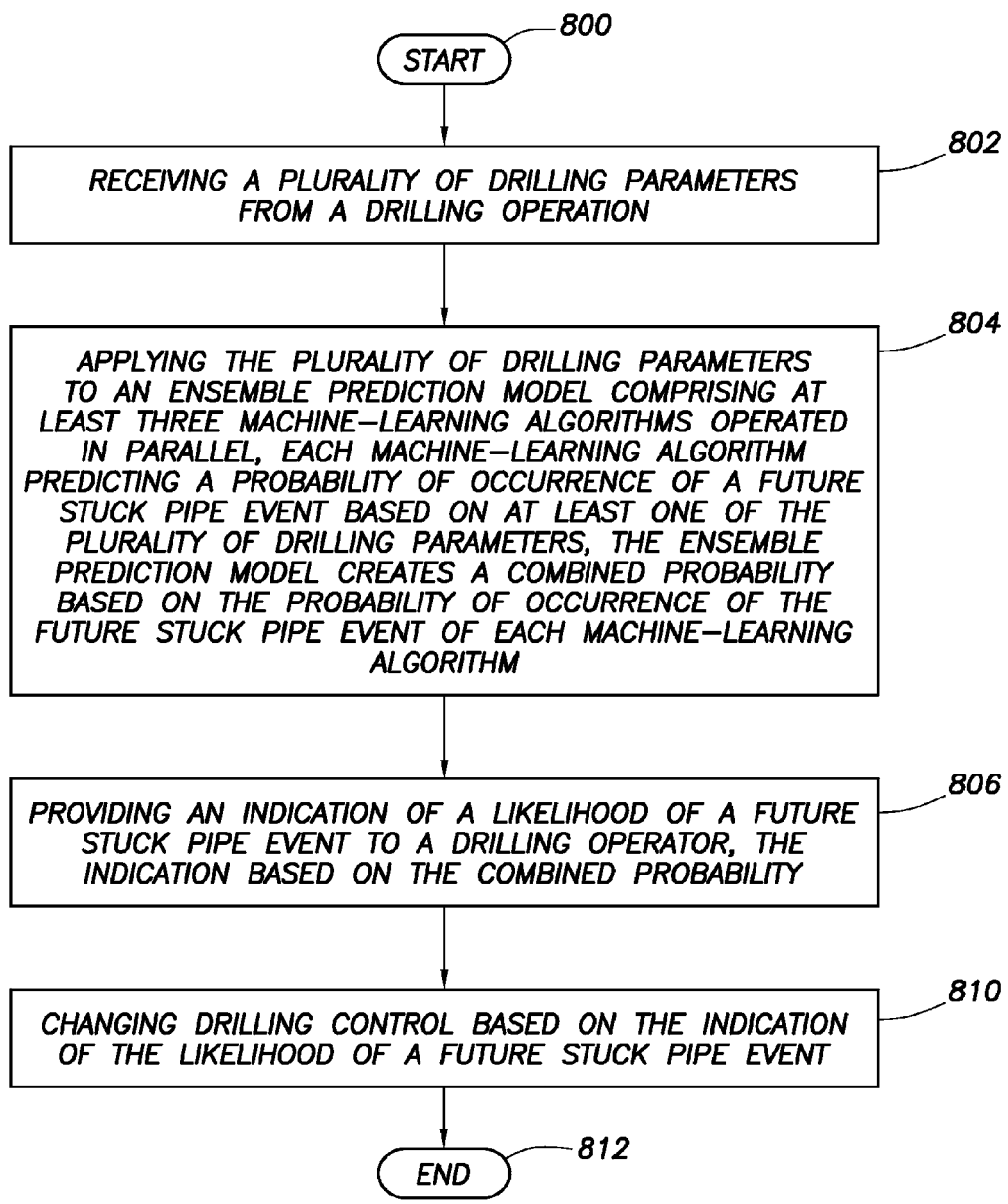
FIG. 8 shows a method in accordance with at least some embodiments.

FIG. 8 shows a method, some or all of which may be implemented by way of computer instructions, in accordance with example embodiments. In particular, the method starts (block 800) and comprises: receiving a plurality of drilling parameters from a drilling operation (block 802); applying the plurality of drilling parameters to an ensemble prediction model comprising at least three machine-learning algorithms operated in parallel, each machine-learning algorithm predicting a probability of occurrence of a future stuck pipe event based on at least one of the plurality of drilling parameters, the ensemble prediction model creates a combined probability based on the probability of occurrence of the future stuck pipe event of each machine-learning algorithm (block 804); providing an indication of a likelihood of a future stuck pipe event to a drilling operator, the indication based on the combined probability (block 806); and changing drilling control based on the indication of the likelihood of a future stuck pipe event (block 808). Thereafter, the method ends (block 810), likely to be immediately restarted.

Figure 9:
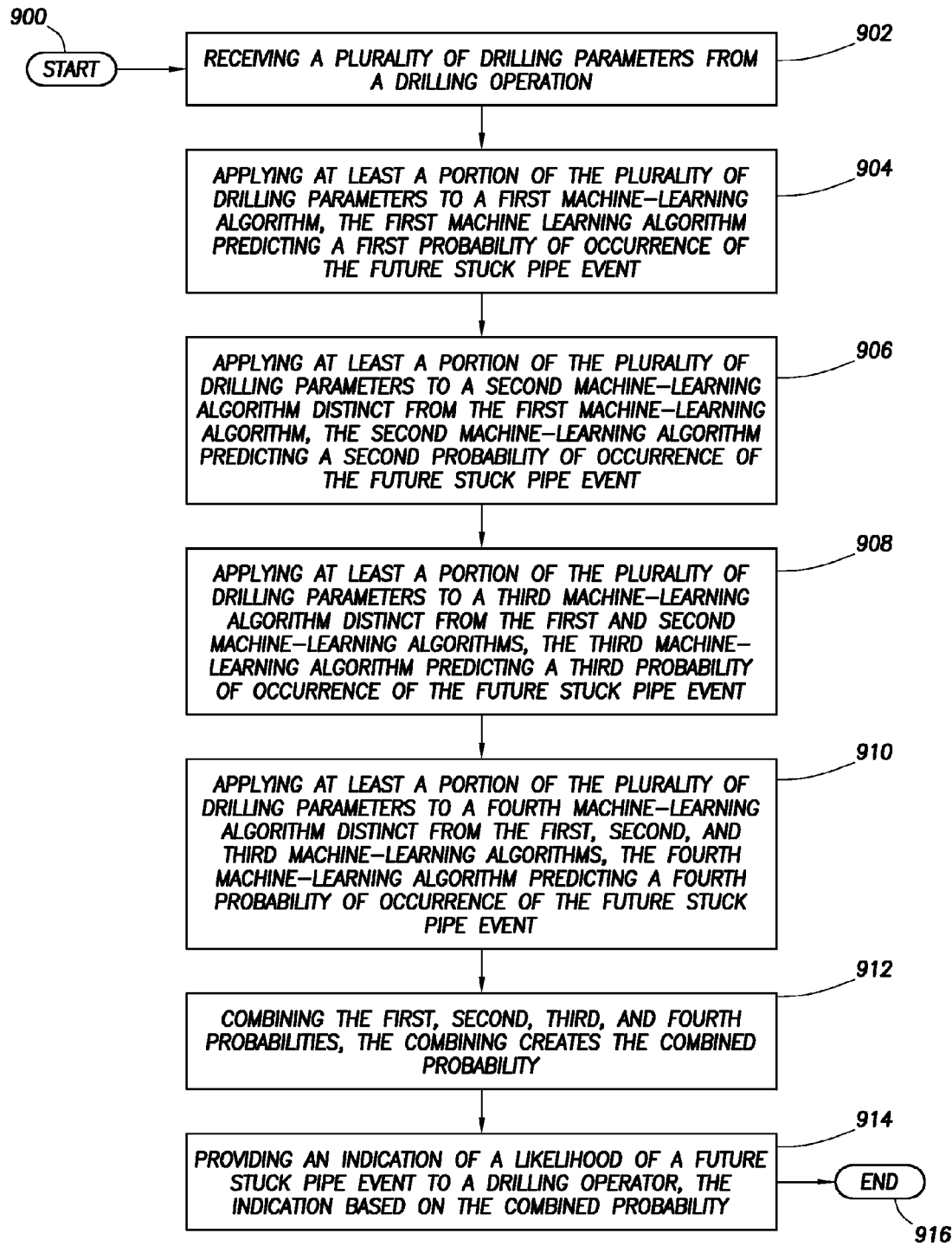
FIG. 9 shows a method in accordance with at least some embodiments.

FIG. 9 shows a method, some of all of which may be implemented by way of computer instructions, in accordance with example embodiments. In particular, the method starts (block 900) and comprises: receiving a plurality of drilling parameters from a drilling operation (block 902); applying at least a portion of the plurality of drilling parameters to a first machine-learning algorithm, the first machine-learning algorithm predicting a first probability of occurrence of the future stuck pipe event (block 904); applying at least a portion of the plurality of drilling parameters to a second machine-learning algorithm distinct from the first machine-learning algorithm, the second machine-learning algorithm predicting a second probability of occurrence of the future stuck pipe event (block 906); applying at least a portion of the plurality of drilling parameters to a third machine-learning algorithm distinct from the first and second machine-learning algorithms, the third machine-learning algorithm predicting a third probability of occurrence of the future stuck pipe event (block 908); applying at least a portion of the plurality of drilling parameters to a fourth machine-learning algorithm distinct from the first, second, and third machine-learning algorithms, the fourth machine-learning algorithm predicting a third probability of occurrence of the future stuck pipe event (block 910); combining the first, second, third, and fourth probabilities, the combining creates the combined probability (block 912); and providing an indication of a likelihood of a future stuck pipe event to a drilling operator, the indication based on the combined probability (block 914). Thereafter the method ends (block 916), likely to be immediately restarted.

Figure 10:
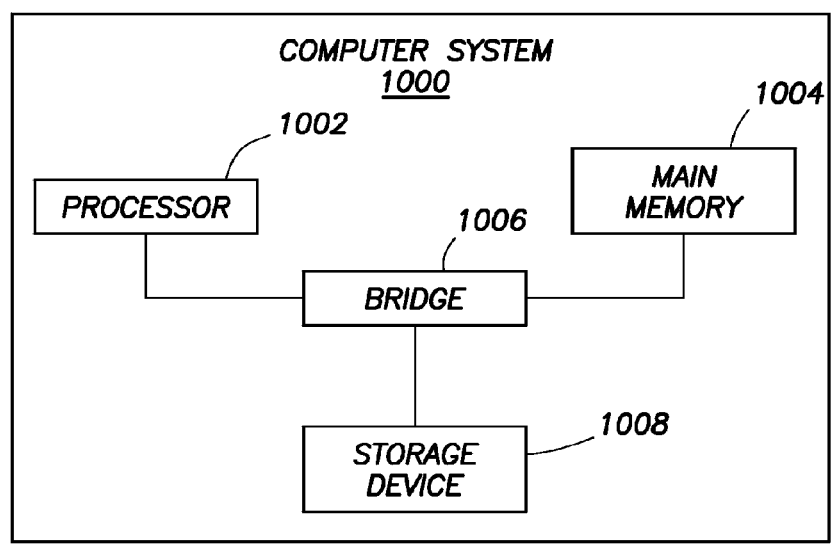
FIG. 10 shows a computer system in accordance with at least some embodiments.

FIG. 10 shows a computer system 1000 which is illustrative of a computer system upon which the various embodiments may be practiced. For example, computer system 1000 may be illustrative of computer systems 136 and/or 146 from FIG. 1. In one embodiment, computer system 1000 may be located at, and coupled to, a land-based or sub-sea drilling operation. In another embodiment, computer system 1000 may be located remotely from the well location, and thus, information received from the well may be received by way of a wireless transmission. The computer system 1000 comprises a processor 1002, and the processor couples to a main memory 1004 by way of a bridge device 1006. Programs executable by the processor 1002 may be stored on storage device 1008 (e.g., a hard drive, solid state disk, memory stick, optical disc), and accessed when needed by the processor 1002. The program stored on the storage device 1008 may comprise programs to implement the various embodiments of the present specification, such as determining the probability of the occurrence of a stuck pipe event. In some cases, the programs are copied from the storage device 1008 to the main memory 1004, and the programs are executed from the main memory 1004. Thus, both the main memory 1004 and storage device 1008 shall be considered computer-readable storage mediums.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments," "example systems," "example methods" or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
receiving, at a computer system, a plurality of drilling parameters from a drilling operation;
applying, by the computer system, the plurality of drilling parameters to an ensemble prediction model comprising at least three machine-learning algorithms operated in parallel, each machine-learning algorithm predicting a probability of occurrence of a future stuck pipe event based on at least one of the plurality of drilling parameters, the ensemble prediction model creates a combined probability based on the probability of occurrence of the future stuck pipe event of each machine-learning algorithm; and
providing an indication of a likelihood of a future stuck pipe event to a drilling operator, the indication based on the combined probability.

2. The method of claim 1 further comprising changing drilling control based on the indication of the likelihood of a future stuck pipe event.

3. The method of claim 1 wherein applying the plurality of drilling parameters to the ensemble prediction model further comprises:
applying at least a portion of the plurality of drilling parameters to a first machine-learning algorithm, the first machine-learning algorithm predicting a first probability of occurrence of the future stuck pipe event;
applying at least a portion of the plurality of drilling parameters to a second machine-learning algorithm distinct from the first machine-learning algorithm, the second machine-learning algorithm predicting a second probability of occurrence of the future stuck pipe event;
applying at least a portion of the plurality of drilling parameters to a third machine-learning algorithm distinct from the first and second machine-learning algorithms, the third machine-learning algorithm predicting a third probability of occurrence of the future stuck pipe event;
combining, by the computer system, the first, second, and third probabilities, the combing creates the combined probability.

4. The method of claim 3 wherein combining further comprises:
assigning weighting coefficients to each of the first, second, and third probabilities of occurrence; and
creating the combined probability based on the weighting coefficients and the respective first, second, and third probabilities.

5. The method of claim 4 wherein assigning weighting coefficients further comprises assigning weighting coefficients based on at least one selected from the group consisting of: missing data in the drilling parameters applied to the machine-learning algorithms; and accuracy of a machine-leaning algorithm for a particular state of the drilling operation.

6. The method of claim 1:
wherein, prior to providing the indication of the combined probability, the method further comprises applying the combined probability to a Markov model, the Markov model evaluating for false indications, and the Markov model creating a modified combined probability; and
wherein providing further comprises providing the indication based on the modified combined probability.

7. The method of claim 1 wherein applying further comprises:
reading historical data for the plurality of drilling parameters, the historical data spanning a predetermined period of time;
submitting the historical data to the ensemble prediction model as data gathered prior to a current time; and
submitting the historical data as data gathered after the current time.

8. The method of claim 1 wherein receiving further comprises receiving in real-time with the drilling operation.

9. The method of claim 1 wherein, prior to the receiving, applying, and providing, the method further comprises training the ensemble prediction model from a plurality of historical data sets related to at least one actual stuck pipe event from a previous drilling operation.

10. The method of claim 1 wherein receiving a plurality of drilling parameters from the drilling operation further comprises receiving at least one selected from the group comprising: a value indicative of weight-on-bit; a value indicative of hook load; a value indicative of rate-of-penetration; a value indicative of rotary speed of the drill pipe; a value indicative of torque applied to the drill pipe; a value indicative of drilling fluid pump pressure; a value indicative of occurrence of natural gammas; a value indicative of inclination of the drill string; a value indicative of length of drill string; measurement-while-drilling data; logging-while-drilling data; and a value indicative of drilling fluid flow rate.

11. The method of claim 1 wherein applying the plurality of drilling parameters to the ensemble prediction model further comprises:
applying at least a portion of the plurality of drilling parameters to a neural network, the neural network predicting a first probability of occurrence of the future stuck pipe event;
applying at least a portion of the plurality of drilling parameters to a support vector machine, the support vector machine predicting a second probability of occurrence of the future stuck pipe event;
applying at least a portion of the plurality of drilling parameters to a decision tree, the decision tree predicting a third probability of occurrence of the future stuck pipe event;
applying at least a portion of the plurality of drilling parameters to a Bayesian method, the Bayesian method predicting a third probability of occurrence of the future stuck pipe event;
combining, by the computer system, the first, second, third, and fourth probabilities, the combing creates the combined probability.

12. The method of claim 11:
wherein, prior to providing the indication of the combined probability, the method further comprises applying the combined probability to a Markov model, the Markov model evaluating for false indications, and the Markov model creating a modified combined probability; and
wherein providing further comprises providing the indication based on the modified combined probability.

13. A computer system comprising:
a processor;
a memory coupled to the processor;
wherein the memory storing a program that, when executed by the processor causes the program to:
receive a plurality of drilling parameters from a drilling operation;

apply at least a portion of the plurality of drilling parameters to a first machine-learning algorithm, the first machine-learning algorithm predicting a first probability of occurrence of the future stuck pipe event;

apply at least a portion of the plurality of drilling parameters to a second machine-learning algorithm distinct from the first machine-learning algorithm, the second machine-learning algorithm predicting a second probability of occurrence of the future stuck pipe event;

apply at least a portion of the plurality of drilling parameters to a third machine-learning algorithm distinct from the first and second machine-learning algorithms, the third machine-learning algorithm predicting a third probability of occurrence of the future stuck pipe event;

combine the first, second, and third probabilities, the combing creates the combined probability; and provide an indication of a likelihood of a future stuck pipe event to a drilling operator, the indication based on the combined probability.

14. The computer system of claim 13 wherein when the processor combines, the program further causes the processor to:

assign weighting coefficients to each of the first, second, and third probabilities of occurrence; and create the combined probability based on the weighting coefficients and the respective first, second, and third probabilities.

15. The computer system of claim 14 wherein when the processor assigns, the program further causes the processor to assign weighting coefficients based on at least one selected from the group consisting of: missing data in the drilling parameters applied to the machine-learning algorithms; and accuracy of a machine-leaning algorithm for a particular state of the drilling operation.

16. The computer system of claim 13:

wherein program further causes the processor to apply the combined probability to a Markov model, the Markov model evaluating for false indications, and the Markov model creates a modified combined probability; and wherein when the processor provides, the program causes the processor to provide the indication based on the modified combined probability.

17. The computer system of claim 13 wherein when the processor applies the plurality of drilling parameters, the program causes the processor to:

read historical data for the plurality of drilling parameters, the historical data spanning a predetermined period of time;

submit the historical data to at least some of the machine-learning algorithms as data gathered prior to a current time; and submit the historical data to at least some of the machine-learning algorithms as data gathered after the current time.

18. The computer system of claim 13 wherein when the processor receives, the program causes the processor to receive in real-time with the drilling operation.

19. The computer system of claim 13 wherein when the processor receives, the program causes the processor to receive at least one selected from the group comprising: a value indicative of weight-on-bit; a value indicative of hook load; a value indicative of rate-of-penetration; a value indicative of rotary speed of the drill pipe; a value indicative of torque applied to the drill pipe; a value indicative of drilling fluid pump pressure; a value indicative of occurrence of natural gammas; a value indicative of inclination of the drill string; a value indicative of length of drill string; measurement-while-drilling data; logging-while-drilling data; and a value indicative of drilling fluid flow rate.

20. The computer system of claim 13:

wherein when the processor applies at least a portion of the plurality of drilling parameters to the first machine-learning algorithm, the program causes the processor to apply to a neural network;

wherein when the processor applies at least a portion of the plurality of drilling parameters to the second machine-learning algorithm, the program causes the processor to apply to a support vector machine;

wherein when the processor applies at least a portion of the plurality of drilling parameters to the third machine-learning algorithm, the program causes the processor to apply to a Bayesian method;

wherein the program further causes the processor to apply at least a portion of the plurality of drilling parameters to a decision tree, the decision tree predicting a fourth probability of occurrence of the future stuck pipe event; and wherein when the processor combines, the program causes the processor to combine the first, second, third, and fourth probabilities.

21. The computer system of claim 20:

wherein, prior to the processor providing the indication of the combined probability, the program further causes the processor to apply the combined probability to a Markov model, the Markov model evaluating for false indications, and the Markov model creates a modified combined probability; and wherein when the processor provides, the program further cause the processor to provide the indication based on the modified combined probability.

22. The computer system of claim 13 wherein when the processor receives, the program further causes the processor to receive from a drilling operation remote from the computer system.

23. A non-transitory computer-readable medium storing a program that, when executed by a processor, causes the processor to:

receive a plurality of drilling parameters from a drilling operation;

apply at least a portion of the plurality of drilling parameters to a neural network, the neural network predicting a first probability of occurrence of the future stuck pipe event;

apply at least a portion of the plurality of drilling parameters to a decision tree, the decision tree predicting a second probability of occurrence of the further stuck pipe event;

apply at least a portion of the plurality of drilling parameters to a support vector machine, the support vector machine predicting a third probability of occurrence of the further stuck pipe event;

apply at least a portion of the plurality of drilling parameters to a Bayesian method, the Bayesian method predicting a fourth probability of occurrence of the further stuck pipe event;

combine the first, second, third, and fourth probabilities, the combing creates the combined probability; and provide an indication of a likelihood of a future stuck pipe event to a drilling operator, the indication based on the combined probability.

24. The computer-readable medium of claim 23 wherein when the processor combines, the program further causes the processor to:
- assign a weighting coefficient to at least one of the probabilities of occurrence; and
- create the combined probability based on the weighting coefficient and the respective first, second, third, and fourth probabilities.

25. The computer-readable medium of claim 24 wherein when the processor assigns, the program further causes the processor to assign the weighting coefficient based on at least one selected from the group consisting of: missing data in the drilling parameters applied to the machine-learning algorithms; and accuracy of a machine-leaning algorithm for a particular state of the drilling operation.

26. The computer-readable medium of claim 23:
- wherein program further causes the processor to apply the combined probability to a Markov model, the Markov model evaluating for false indications, and the Markov model creates a modified combined probability; and
- wherein when the processor provides, the program causes the processor to provide the indication based on the modified combined probability.

27. The computer-readable medium of claim 23 wherein when the processor applies the plurality of drilling parameters, the program causes the processor to:
- read historical data for the plurality of drilling parameters, the historical data spanning a predetermined period of time;
- submit the historical data to at least some of the machine-learning algorithms as data gathered prior to a current time; and
- submit the historical data to at least some of the machine-learning algorithms as data gathered after the current time.

28. The computer-readable medium of claim 23 wherein when the processor receives, the program causes the processor to receive in real-time with the drilling operation.

29. The computer-readable medium of claim 23 wherein when the processor receives, the program causes the processor to receive at least one selected from the group comprising: a value indicative of weight-on-bit; a value indicative of hook load; a value indicative of rate-of-penetration; a value indicative of rotary speed of the drill pipe; a value indicative of torque applied to the drill pipe; a value indicative of drilling fluid pump pressure; a value indicative of occurrence of natural gammas; a value indicative of inclination of the drill string; length of drill string; measurement-while-drilling data; logging-while-drilling data; and a value indicative of drilling fluid flow rate.

* * * * *